Patented Jan. 9, 1940

2,186,360

UNITED STATES PATENT OFFICE 2,186,360

STYRENE COPOLYMERS

Edgar C. Britton, Midland, Mich., Harry Borden Marshall, Toronto, Ontario, Canada, and Walter J. Le Fevre, Midland, Mich., assignors to The Dow Chemical Company, Midland, Mich., a corporation of Michigan No Drawing. Application February 23, 1938, Serial No. 191,960

15 Claims. (Cl. 260—86)

This invention concerns certain new artificial resins and a method of making the same. It particularly concerns the products obtained by polymerizing styrene in the presence of certain organic esters of phosphoric acid.

Such esters, hereinafter termed "modifying agents", have the general formula

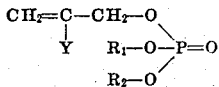

wherein Y represents an alkyl radical or hydrogen, and $R_1$ and $R_2$ represent hydrocarbon groups. Specific examples of such esters are tri-allyl phosphate; tri-methallyl phosphate, i. e. tri-(2-methyl-allyl) phosphate; di-allyl ethyl phosphate; mono-methallyl di-phenyl phosphate; mono-allyl di-(o-xenyl) phosphate; di-ethylallyl mono-naphthyl phosphate; mono-methallyl ethyl butyl phosphate; di-methallyl isopropyl phosphate; mono-allyl di-benzyl phosphate; mono-allyl di-methallyl phosphate; etc.

The new artificial resins prepared according to the invention are clear, transparent solids, having the general appearance and physical properties of polystyrene. They vary in solubility from products readily soluble in aromatic solvents such as benzene, toluene, xylene, etc., to products which are substantially insoluble, but swell somewhat when contacted with such solvents. The solubility characteristics of the new products are dependent upon conditions of preparation hereinafter discussed. All of the new resins may be molded or otherwise shaped to obtain clear, transparent objects which display less tendency than polystyrene itself to blush or craze on standing. They possess excellent dielectric properties and are adapted for use as, or in, electric insulators. They are also adapted to a variety of other uses, such as the preparation of varnishes; lacquers; paints and other coating compositions; films and foils; optical lenses; impregnating compositions; laminated glass; etc.

The products prepared according to the invention possess a number of other characteristics, e. g. decreased solubility in aromatic solvents, gradual increases in molecular weight during their preparation by polymerization, etc., which distinguish them from polystyrene itself. They are believed to be new chemical compounds formed by chemical reaction between styrene and the modifying agents during polymerization.

The new products are prepared by mixing a minor proportion of the modifying agent with styrene or partially polymerized styrene and thereafter polymerizing the mixture. The polymerization may be carried out in any of the known ways, e. g. by polymerizing directly in the presence or absence of added agents such as solvents, accelerating agents, fillers, emulsifiers, etc., but the properties and form of the polymers may vary considerably with changes in the conditions of polymerization. For example, the polymerization may be carried out in the presence of an aromatic solvent such as benzene, toluene, etc., to produce the polymer in the form of a gel which may be precipitated as a fine powder by addition of a non-solvent liquid such as ethanol.

The variable conditions having greatest influence on the properties of the polymer are the proportion of modifying agent, temperature of polymerization, and the time of polymerization.

The proportions of modifying agent and styrene may be varied between wide limits, but the solubility of the product in aromatic solvents and/or its tendency to swell when contacted with such solvents decrease as the proportion of modifying agent is increased. For example, a polymer prepared by polymerizing monomeric styrene in the presence of 2 per cent by weight of tri-methallyl phosphate is soluble in benzene whereas a similar polymer containing 4 per cent of tri-methallyl phosphate is insoluble and swells to only a slight degree. In general, it is preferable to employ between 0.0025 and 0.25 part by weight of modifying agent per part of styrene although the modifying agent may be employed in greater proportion if desired.

The polymerization of a liquid mixture of styrene and a modifying agent of the present type takes place very slowly on standing in the dark at room temperature. Accordingly, such liquid mixture may be prepared and thereafter shipped in closed containers to the ultimate consumer where it may be polymerized in any desired manner. The liquid mixture may be stabilized against polymerization by light or moderately elevated temperatures by the addition of an inhibitor such as quinone, trinitrobenzene, etc.

Because of the low rate at which the liquid mixture of styrene and the modifying agent polymerizes, it is preferable to accelerate the polymerization by the use of heat, actinic light, or an accelerating agent such as benzoyl peroxide, ozone, strong mineral acid, etc. The polymerization is usually carried out by heating the mixture of styrene and modifying agent at a temperature between 50° and 180° C., although higher temperatures may be employed if desired. The polymerization may be further accelerated by the use of a small proportion, e. g. 0.5 per cent by weight or less, of an accelerating agent such as benzoyl peroxide, ozone, etc. The use of such accelerating agents in considerable amounts may lead to the formation of brittle products of low molecular weight, but when such agents are employed in the small proportions just recommended they have little effect on the properties of the products.

The solid polymers initially formed during polymerization are of the low molecular weight type, soluble in benzene, but the polymerization may be continued to form ultimate polymers of high molecular weight. The latter are also soluble when the temperature of polymerization is above about 180° C., but are usually of the insoluble, swelling type when the polymerization is carried out at temperatures below 180° C. The rate at which the insoluble polymers are formed increases with increase in the proportion of the modifying agent. For example, styrene containing 3 per cent by weight of tri-methallyl phosphate must be heated for 48 hours at 140° C. before the insoluble, swelling type of polymer is formed, whereas styrene containing 10 per cent of tri-methallyl phosphate need be heated only 10 hours at 140° C. in order to form an insoluble polymer. Accordingly, there are at least three operating conditions, i. e. temperature, time of reaction, and proportion of modifying agent, which may be varied in producing a polymer of the present type, and considerable flexibility in the conditions for manufacturing the products is permitted.

As stated above, the initial solid products obtained by polymerizing a mixture of styrene and a modifying agent at temperatures between 50° and 180° C. are of the type soluble in benzene, but continued polymerization at these same temperatures results in the formation of products which are usually insoluble in benzene and capable only of swelling when contacted therewith. Regardless of the temperature at which the polymerization is carried out, the viscosity and average molecular weight of the liquid mixture undergoing polymerization gradually increases until solidification occurs, after which the average molecular weight of the solid polymer continues to increase until the polymerization is complete. Similar behavior is observed when polymerizing in solution or in aqueous emulsion. For example, when styrene and one of the modifying agents of the present class is dissolved in an inert solvent such as benzene and thereafter subjected to polymerizing conditions, the viscosity of the solution gradually increases until gelatination occurs.

Accordingly, liquid polymeric mixtures of desired viscosity, or solid polymers which, when dissolved in a suitable solvent, give solutions of desired viscosity, may be prepared by interrupting the polymerization at the point necessary to yield such incompletely polymerized products. Such products are adapted to use in lacquers, varnishes, paints, etc., and they may frequently be employed in the manufacture of films suitable for use in photography or as wrapping materials.

As indicated above, the polymerization of a given mixture of styrene with one of the modifying agents may be stopped at an intermediate point or continued to completion to obtain a large number of products varying over a wide range in such characteristics as molecular weight, solubility, physical appearance, etc. When the polymerization is carried out at elevated temperatures using little or no accelerating agent, it may be interrupted merely by cooling the mixture to room temperature or thereabout, after which further polymerization is not noticeable.

The solid polymers are usually obtained in a form suitable for molding without further purification, but if an especially refined product is desired, the initial products may be ground, extracted with a solvent such as acetone or ethanol, and dried to form molding powders. If the polymer is of the type capable of being swelled, it may be dispersed in a swelling solvent and then precipitated in finely divided form by addition of a non-solvent liquid such as ethanol. As in the case of polystyrene itself, the physical properties, e. g. hardness, impact strength, etc., of the new resins vary somewhat with the purity of the styrene employed in preparing them.

The following examples will illustrate various ways in which the principle of our invention has been applied, but are not to be construed as limiting the same:

*Example 1*

A mixture of 96 parts of styrene and 4 parts of trimethallyl phosphate is polymerized by heating at 100°–110° C. for 4 days. The product is dispersed in benzene and precipitated in finely divided form by addition of ethanol. A test specimen which has been molded at 150° C. is a clear, transparent resin, insoluble in acetone and ethanol and capable only of swelling when contacted with benzene. It has a tensile strength of about 5200 lbs./sq. in., a heat distortion value of about 62° C., and a Shore scleroscope hardness of about 75.

*Example 2*

A mixture of 95 parts of styrene and 5 parts of triallyl phosphate is heated at 95° C. for 3 days. The polymerized product is a colorless glass-like resin, capable of being molded, cut, planed, polished, etc. It swells but does not dissolve in benzene, and is insoluble in acetone and ethanol. A molded test specimen has the same general physical properties as the product described in Example 1.

*Example 3*

Monomeric styrene is polymerized to a thick liquid by heating at 125° C. for several hours. A mixture of 95 parts of the partially polymerized styrene so prepared and 5 parts of tri-methallyl phosphate is polymerized by heating at 125° C. for 48 hours. The colorless, resinous polymer swells but does not dissolve in benzene and is insoluble in acetone and ethanol.

*Example 4*

A mixture of 98 parts of monomeric styrene and 2 parts of mono-methallyl di-phenyl phosphate is heated at 140° C. for 48 hours to give a resinous product which is soluble in benzene and other aromatic solvents, but insoluble in acetone and ethanol.

*Example 5*

A mixture of 90 parts of styrene and 10 parts of tri-methallyl phosphate is polymerized by heating at 140° C. for 11 hours. During polymerization, samples of the mixture are taken and their respective molecular weights determined by viscosity measurements. The samples are also extracted with ethanol to remove any uncombined tri-methallyl phosphate and the extracted samples analyzed for combined phosphorus. The data obtained is shown in the following table:

STYRENE + 10% TRI-METHALLYL PHOSPHATE POLYMERIZED AT 140° C.

| Time, hrs. | Solubility in benzene | Molecular weight | Percent combined tri-methallyl phosphate | Percent polymerization |
|---|---|---|---|---|
| 2.0 | Soluble | 29,000 |  | 55.6 |
| 3.25 | do | 33,000 |  | 55.8 |
| 4.1 | do | 33,500 | 3.27 | 61.7 |
| 5.0 | do | 43,000 | 2.02 | 66.2 |
| 7.0 | do | 47,000 | 2.10 | 70.5 |
| 8.0 | do | 59,000 | 2.68 | 72.8 |
| 9.0 | Barely soluble | 64,500 | 2.68 | 74.7 |
| 10.0 | Insoluble |  | 2.68 | 76.0 |
| 11.0 | do |  | 3.02 | 81.3 |

*Example 6*

A mixture of 90 parts of styrene and 10 parts of di-methallyl o-xenyl phosphate is polymerized by heating at 100°–110° C. for 4 days. A molded test specimen of the product is a colorless resin having a tensile strength of approximately 4500 lbs./sq. in., a Shore hardness of about 83, and a heat distortion value of about 93° C.

*Example 7*

A mixture of 95 parts of styrene and 5 parts of tri-allyl phosphate is dissolved in benzene and heated under reflux for 5 days. The reaction mixture polymerizes to a stiff gel from which the polymer may be precipitated in finely divided form by addition of ethanol. A molded specimen of the precipitated polymer is similar to the product described in Example 2 in appearance and physical properties.

*Example 8*

A mixture of 98 parts of styrene and 2 parts of tri-methallyl phosphate is polymerized at 100°–110° C. for 4 days. A benzene dispersion of the polymerized product is poured into ethanol whereby the polymer is precipitated. A test specimen which has been molded at 150° C. shows a power factor of about 0.5 per cent, and a dielectric constant of about 2.71.

*Example 9*

A sample of monomeric styrene is polymerized to a thick liquid by heating at 125° C. for several hours. A mixture comprising 90 parts of the partially polymerized styrene and 10 parts of tri-allyl phosphate is added dropwise with rapid stirring to a 5 per cent aqueous solution of an emulsifying agent such as albumin, sodium caseinate, etc. The thick, stable emulsion which forms is then polymerized by heating at 90° C. for 6 days to give a white, translucent polymer which is insoluble in benzene. A molded specimen of the product is somewhat more brittle than polystyrene itself.

*Example 10*

A mixture of 50 parts of monomeric styrene and 2 parts of tri-methallyl phosphate is polymerized at 100°–110° C. for 89 hours. The polymerized product is ground in a Wiley mill, dispersed in benzene and precipitated with ethanol. A test specimen which has been molded at 150° C. is a clear, glass-like resin which swells only slightly in benzene. It has a tensile strength of about 11,000 lbs./sq. in., a heat distortion value of 92° C., a dielectric constant of about 2.4, and a power factor of about 0.04 per cent.

The liquid mixture of styrene and a modifying agent hereinbefore described may, if desired, be polymerized in the presence of added agents such as dyes, pigments, fillers, etc. to obtain polymerized products comprising such coloring matter or fillers, and having properties modified by the presence of such added substances. Also, such addition agents may be incorporated with the solid polymers before molding to produce decorative effects or to modify certain physical properties of the molded product.

Other modes of applying the principle of our invention may be employed instead of those explained, change being made as regards the method herein disclosed or the materials employed, provided the step or steps stated by any of the following claims be employed or the product claimed in any of the following claims be obtained.

We therefore particularly point out and distinctly claim as our invention:

1. The process which comprises polymerizing a mixture of styrene and a phosphoric acid ester having the general formula

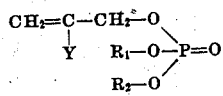

wherein Y represents a substituent selected from the class consisting of alkyl radicals and hydrogen, and $R_1$ and $R_2$ each represents a hydrocarbon group.

2. The process which comprises heating at a temperature between 50° and 180° C. a mixture of styrene with between 0.25 and 25 per cent of its weight of a phosphoric acid ester having the general formula

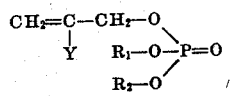

wherein Y represents a substituent selected from the class consisting of alkyl radicals and hydrogen, and $R_1$ and $R_2$ each represents a hydrocarbon group.

3. The process which comprises polymerizing styrene with between 0.25 and 25 per cent of its weight of trimethallyl phosphate.

4. The process which comprises polymerizing styrene with between 0.25 and 25 percent of its weight of tri-allyl phosphate.

5. The process which comprises polymerizing styrene with between 0.25 and 25 per cent of mono-methallyl di-phenyl phosphate.

6. The process which comprises polymerizing in aqueous emulsion a mixture of styrene and a phosphoric acid ester having the general formula

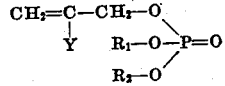

wherein Y represents a substituent selected from the class consisting of alkylradicals and hydrogen, and $R_1$ and $R_2$ each represents a hydrocarbon group.

7. The process which comprises polymerizing a mixture of partially polymerized styrene and a phosphoric acid ester having the general formula

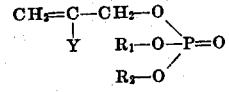

wherein Y represents a substituent selected from the class consisting of alkyl radicals and hydrogen, and $R_1$ and $R_2$ each represents a hydrocarbon group.

8. The process which comprises polymerizing a mixture of styrene and a phosphoric acid ester having the general formula

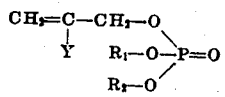

wherein Y represents a substituent selected from the class consisting of alkyl radicals and hydrogen, and $R_1$ and $R_2$ each represents a hydrocarbon group, stopping the polymerization before the mixture solidifies and distilling off unpolymerized material.

9. The products of the conjoint polymerization of styrene and a phosphoric acid ester having the general formula

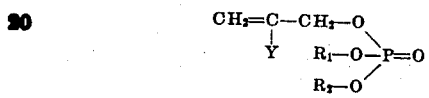

wherein Y represents a substituent selected from the class consisting of alkyl radicals and hydrogen, and $R_1$ and $R_2$ each represent a hydrocarbon group.

10. An artificial resin prepared by heating at a temperature between 50° and 180° C. a mixture of styrene and between 0.25 and 25 per cent of its weight of phosphoric acid ester having the general formula

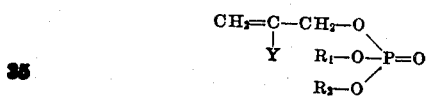

wherein Y represents a substituent selected from the class consisting of alkyl radicals and hydrogen, and $R_1$ and $R_2$ each represents a hydrocarbon group.

11. The products of the conjoint polymerization of styrene and tri-methallyl phosphate.

12. The products of the conjoint polymerization of styrene and tri-allyl phosphate.

13. The products of the conjoint polymerization of styrene and mono-methallyl di-phenyl phosphate.

14. An artificial resin prepared by polymerizing while in an aqueous emulsion a mixture of styrene and a phosphoric acid ester having the general formula

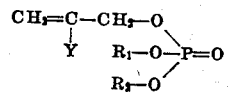

wherein Y represents a substituent selected from the class consisting of alkyl radicals and hydrogen, and $R_1$ and $R_2$ each represents a hydrocarbon group.

15. An artificial resin prepared by polymerizing a mixture of styrene and a phosphoric acid ester having the general formula

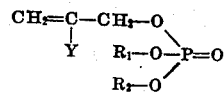

wherein Y represents a substituent selected from the class consisting of alkyl radicals and hydrogen, and $R_1$ and $R_2$ each represents a hydrocarbon group, stopping the polymerization before the mixture solidifies and removing unpolymerized material by distillation.

EDGAR C. BRITTON.
WALTER J. LE FEVRE.
HARRY BORDEN MARSHALL.